United States Patent
Baldwin

(10) Patent No.: US 12,334,717 B1
(45) Date of Patent: Jun. 17, 2025

(54) SELF-LEVELING FLOOR OUTLET COVER

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

(21) Appl. No.: 18/390,037

(22) Filed: Dec. 20, 2023

Related U.S. Application Data

(63) Continuation of application No. 18/078,342, filed on Dec. 9, 2022, now Pat. No. 11,888,300, which is a continuation of application No. 17/398,896, filed on Aug. 10, 2021, now Pat. No. 11,539,195, which is a continuation of application No. 16/698,596, filed on Nov. 27, 2019, now Pat. No. 11,088,516.

(60) Provisional application No. 62/772,110, filed on Nov. 28, 2018.

(51) Int. Cl.
| | |
|---|---|
| *H02G 3/08* | (2006.01) |
| *H01R 13/518* | (2006.01) |
| *H02G 3/14* | (2006.01) |
| *H02G 3/18* | (2006.01) |

(52) U.S. Cl.
CPC ........... *H02G 3/081* (2013.01); *H01R 13/518* (2013.01); *H02G 3/14* (2013.01); *H02G 3/185* (2013.01)

(58) Field of Classification Search
CPC .......... H02G 3/081; H02G 3/14; H02G 3/185; H02G 3/18; H02G 3/08; H02G 3/12; H02G 3/088; H01R 13/518
See application file for complete search history.

(56) References Cited

U.S. PATENT DOCUMENTS

| | | | |
|---|---|---|---|
| 2,886,630 A | | 5/1959 | Gill |
| 3,027,416 A | | 3/1962 | Kissel |
| 3,064,850 A | | 11/1962 | Kelly, Jr. |
| 3,956,573 A | * | 5/1976 | Myers .................. H02G 3/185 |
| | | | 174/67 |
| 4,059,321 A | | 11/1977 | Rasmussen |
| 4,228,317 A | | 10/1980 | Cziment |
| 5,021,608 A | | 6/1991 | Hadfield |
| 5,541,362 A | | 7/1996 | Reinert, Sr. |
| 5,671,531 A | | 9/1997 | Mugiya |

(Continued)

*Primary Examiner* — Hoa C Nguyen
*Assistant Examiner* — Amol H Patel
(74) *Attorney, Agent, or Firm* — Kenneth C. Booth; Booth Udall, PLC

(57) ABSTRACT

A self-leveling floor mounted electrical outlet assembly may include a cylindrical housing with a threaded inner surface. A mounting frame may be rotatably coupled to the threaded inner surface of the cylindrical housing to adjustably position the mounting frame within the housing and provide for a rough elevation adjustment of an electrical receptacle or wiring device. The mounting frame may further comprise a first portion or outer disk comprising an edge mateably coupled with the threaded inner surface of the cylindrical housing, and a second portion or yoke support comprising at least one threaded fastener extending from the second portion to the threaded opening, the at least one threaded fastener coupled to the threaded opening to adjustably position the second portion with respect to the first portion and configured to provide for a fine elevation adjustment. A wiring device may be coupled to the second portion of the mounting frame.

18 Claims, 9 Drawing Sheets

(56) References Cited

U.S. PATENT DOCUMENTS

| | | | |
|---|---|---|---|
| 5,783,774 | A | 7/1998 | Bowman |
| 8,921,712 | B1 | 12/2014 | Gretz |
| 10,283,951 | B1 | 5/2019 | Gretz |
| 10,559,915 | B1 | 2/2020 | Pahulje |
| 10,938,194 | B1 | 3/2021 | Holleschau |
| 11,038,300 | B1 | 6/2021 | Baldwin |
| 11,159,005 | B1 | 10/2021 | Baldwin |
| 11,563,314 | B1 | 1/2023 | Baldwin |
| 11,588,268 | B1 | 2/2023 | Baldwin |
| 11,862,893 | B1 | 1/2024 | Baldwin |
| 2002/0096350 | A1 | 7/2002 | Young |
| 2003/0109172 | A1 | 6/2003 | Foden |
| 2004/0175975 | A1 | 9/2004 | Drane |
| 2004/0242060 | A1 | 12/2004 | Plzak |
| 2005/0042915 | A1 | 2/2005 | Hsiao |
| 2006/0027386 | A1 | 2/2006 | Drane |
| 2006/0065422 | A1 | 3/2006 | Broyles |
| 2009/0194323 | A1 | 8/2009 | Jolly |
| 2009/0218128 | A1 | 9/2009 | Carbone |
| 2011/0005799 | A1 | 1/2011 | Drane |
| 2011/0228552 | A1 | 9/2011 | Kevelos |
| 2015/0171572 | A1 | 6/2015 | Carbone |
| 2015/0264827 | A1 | 9/2015 | Hantschel |
| 2016/0352087 | A1 | 12/2016 | Wurms |
| 2019/0058315 | A1 | 2/2019 | Korcz |
| 2019/0310052 | A1 | 10/2019 | Krausz |
| 2020/0036174 | A1 | 1/2020 | Diakomis |
| 2020/0052432 | A1 | 2/2020 | Byrne |
| 2020/0052471 | A1 | 2/2020 | Byrne |
| 2020/0412070 | A1 | 12/2020 | Owen |
| 2022/0006274 | A1 | 1/2022 | Beristany |

\* cited by examiner

SELF-LEVELING FLOOR OUTLET COVER

CROSS REFERENCE TO RELATED APPLICATIONS

This application is a continuation of U.S. patent application Ser. No. 18/078,342 to Jeffrey P. Baldwin titled "Self-Leveling Floor Outlet Cover" filed Dec. 9, 2022, which is a continuation of U.S. patent application Ser. No. 17/398,896 to Jeffrey P. Baldwin titled "Self-Leveling Floor Outlet Cover" filed Aug. 10, 2021, now issued as, which is a continuation of U.S. patent application Ser. No. 16/698,596 to Jeffrey P. Baldwin titled "Self-Leveling Floor Outlet Cover" filed Nov. 27, 2019, now issued as U.S. Pat. No. 11,088,516, which claims the benefit, including the filing date, of U.S. Provisional Patent application No. 62/772,110 to Jeffrey P. Baldwin and John E. Klein titled "Horizontal Surface Enclosures" filed Nov. 28, 2018, the disclosures of which are hereby incorporated herein by this reference.

TECHNICAL FIELD

Aspects of this document relate generally to floor outlet covers.

BACKGROUND

Outlet covers are used on floors and horizontal surfaces to reduce or prevent water, dirt, or other contaminants from entering the electrical outlet.

SUMMARY

Aspects of this document relate to self-leveling electrical outlet assemblies which may comprise a cylindrical housing comprising a threaded inner surface, the threaded inner surface comprising a first threading spacing. A mounting frame may be rotatably coupled to the threaded inner surface of the cylindrical housing and configured to adjustably position the mounting frame within the cylindrical housing. The mounting frame may comprise an outer disk comprising an outer edge mateably coupled with the threaded inner surface. The outer disk may comprise at least three threaded openings extending vertically through the outer disk, the at least three threaded openings comprising a second threading spacing less than the first threading spacing. The mounting frame may comprise a yoke support comprising at least three threaded fasteners extending from the yoke support to the at least three threaded openings in the outer disk. The at least three threaded fasteners may comprise the second threading spacing and be coupled to the at least three threaded openings to adjustably position the yoke support with respect to the outer disk. The yoke support may be configured to receive a wiring device and an outlet cover disposed over the wiring device with openings in the outlet cover aligned with the wiring device. The outer edge of the outer disk may be mateably coupled with the threaded inner surface of the cylindrical housing and be configured to provide for a rough elevation adjustment of the wiring device. The at least three threaded fasteners may extend from the yoke support into the at least three threaded openings in the outer disk and be configured to provide for a fine elevation adjustment of the wiring device.

Particular embodiments may comprise one or more of the following features. The at least three threaded openings in the outer disk are internally threaded. The at least one threaded opening of the outer disk of the mounting frame may comprise at least three threaded openings, and the at least one threaded fastener extending from the yoke support of the mounting frame to the outer disk of the mounting frame may comprise at least three threaded fasteners. The at least three threaded openings and the at least three threaded fasteners disposed within the at least three threaded openings may be separated from each other by an angle of 100-140 degrees as measured with respect to a center of the mounting frame. An adjustable vertical offset between the outer disk of the mounting frame and a yoke support of the mounting frame may be determined by a length of the at least three threaded fasteners. The adjustable space between the outer disk of the mounting frame and the yoke support of the mounting frame may comprise a slope, pitch, or angle to match a slope, pitch, or angle of a floor surrounding the electrical outlet assembly.

According to an aspect, a self-leveling electrical outlet assembly may comprise a housing comprising a threaded inner surface, the threaded inner surface comprising a first threading spacing. A mounting frame may be rotatably coupled to the threaded inner surface of the housing to adjustably position the mounting frame within the housing. The mounting frame may comprise a first portion comprising an edge mateably coupled with the threaded inner surface, the first portion comprising at least one threaded opening comprising a second threading spacing less than the first threading spacing. The mounting frame may comprise a second portion comprising at least one threaded fastener extending from the second portion to the threaded opening. The at least one threaded fastener may comprise the second threading spacing and may be coupled to the threaded opening to adjustably position the second portion with respect to the first portion. The second portion may be configured to be coupled to a wiring device with an outlet cover disposed over the wiring device and with openings in the outlet cover aligned with the wiring device. The edge of the first portion may be mateably coupled with the threaded inner surface of the housing and configured to provide for a rough elevation adjustment of the wiring device. The at least one threaded fastener may extend from the second portion into the at least one threaded opening in the second portion and be configured to provide for a fine elevation adjustment of the wiring device.

Particular embodiments may comprise one or more of the following features. The mounting frame may be disk shaped with the first portion of the mounting frame comprising a shape of an outer ring. The second portion of the mounting frame may be disposed within a perimeter of the outer ring. The at least one threaded opening of the first portion of the mounting frame may comprise at least three threaded opening. The at least one threaded fastener extending from the second portion of the mounting frame to the first portion of the mounting frame may comprise at least three threaded fasteners. The at least three threaded openings and the at least three threaded fasteners disposed within the at least three threaded openings may be separated from each other by an angle of 100-140 degrees as measured with respect to a center of the mounting frame. An adjustable vertical offset between the first portion of the mounting frame and a second portion of the mounting frame that may be determined by a length of the at least three threaded fasteners. The adjustable space between the first portion of the mounting frame and the second portion of the mounting frame may comprise a slope, pitch, or angle to match a slope, pitch, or angle of a floor surrounding the electrical outlet assembly. The at least one threaded opening in the first portion may be internally threaded.

According to an aspect, a self-leveling electrical outlet assembly may comprise a housing comprising a threaded inner surface. A mounting frame may be rotatably coupled to the threaded inner surface of the housing to adjustably position the mounting frame within the housing and be configured to provide for a rough elevation adjustment. The mounting frame may comprise a first portion comprising an edge mateably coupled with the threaded inner surface. The mounting frame may comprise a second portion comprising at least one threaded fastener extending from the second portion to the threaded opening. The at least one threaded fastener may be coupled to the threaded opening to adjustably position the second portion with respect to the first portion and may be configured to provide for a fine elevation adjustment. The second portion may be configured to be coupled to a wiring device.

Particular embodiments may comprise one or more of the following features. The mounting frame may be disk shaped with the first portion of the mounting frame comprising a shape of an outer ring. The second portion of the mounting frame may be disposed within a perimeter of the outer ring. The at least one threaded opening of the first portion of the mounting frame may comprise at least three threaded openings. The at least one threaded fastener extending from the second portion of the mounting frame to the first portion of the mounting frame may comprise at least three threaded fasteners. The threaded inner surface may comprise a first threading spacing. The at least one threaded opening may comprise a second threading spacing less than the first threading spacing. The at least one threaded fastener may comprise the second threading spacing. An adjustable vertical offset may be disposed between the first portion of the mounting frame and a second portion of the mounting frame and may be determined by a length of the at least three threaded fasteners. The adjustable space between the first portion of the mounting frame and the second portion of the mounting frame may comprise a slope, pitch, or angle to match a slope, pitch, or angle of a floor surrounding the electrical outlet assembly. The at least one threaded opening in the first portion may be internally threaded.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This document features a self-leveling floor mounted electrical outlet assembly. There are many features of a self-leveling electrical outlet assembly and implementations disclosed herein, of which one, a plurality, or all features or steps may be used in any particular implementation.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 1:
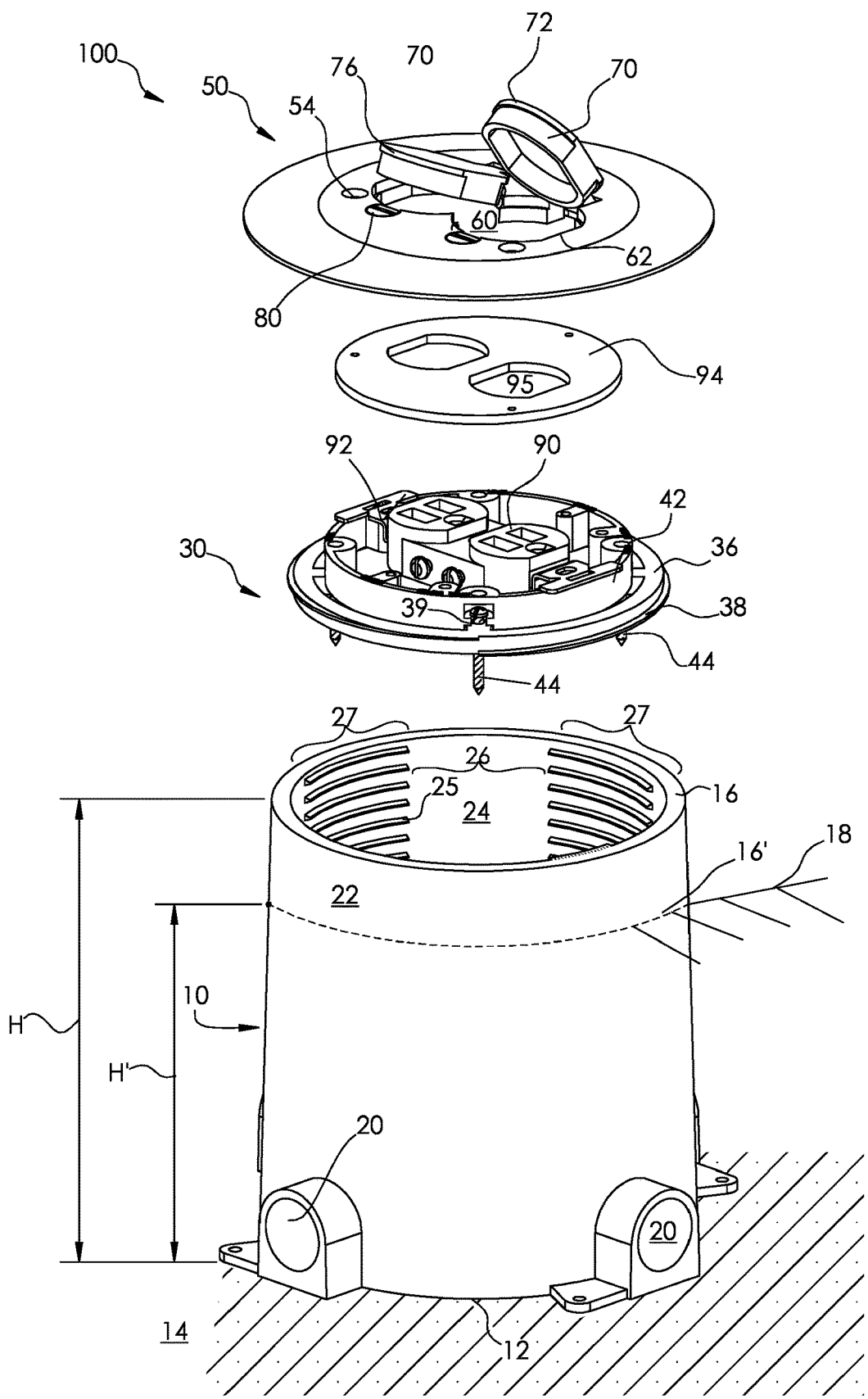
FIG. 1 depicts an exploded perspective view of a self-leveling electrical outlet assembly.

FIG. 1 depicts an exploded perspective view of a non-limiting implementation of an assembly or self-leveling floor mounted electrical outlet assembly 100. The assembly 100 comprises a cylindrical housing, housing, or electrical box 10 that may be formed of concrete, reinforced concrete, cement, plastic, fiberglass, resin, metal, or any other suitable material that provides structural support. As used herein, the term cylindrical refers to a 3-dimensional shape with a cross-sectional area that is circular or substantially circular in shape. While the housing may comprise a circular, or rounded cross-sectional shape in plan view, any other desirable shape may also be used, but for ease of description is referred to herein after as cylindrical. Furthermore, the cylindrical housing or box 10 may comprise slanted or angled sides, such that an area of a first cross-section taken at a first height or elevation of the cylindrical housing may be different than an area of a second cross-section taken at a second height or elevation of the cylindrical housing, the various cross-sections of the cylindrical housing varying along its height.

The housing 10 comprises a lower end, edge, or base 12 that may be disposed on supporting surface, subfloor, or floor 14, such as dirt, an aggregate base course (ABC), concrete, wood, stone, earth, or any other similar or suitable material. The housing 10 also comprises an upper end, edge, or base 16 opposite the lower end 12. The upper end 16 may be disposed at a level of a finished floor or a subfloor 18. A height H of the housing 10 extends between the lower end 12 and the upper end 16.

In some instances, the lower end 12 may rest on a supporting surface 14, like ABC, before a concrete floor or subfloor is poured around the housing 10. After the housing 10 is positioned at a desired location, conduit, tubing, or wiring can be extended to and coupled with the openings or conduit access points 20. After coupling the conduit to the housing 10, the concrete floor can be poured in around the housing 10 and over the conduit and the supporting surface 14. In some instances, when the height H of the housing 10 positions the upper end 16 above the level, elevation, or finish floor height of the finished floor or subfloor 18, the upper end 16 can be cut down or reduced to a lower height or lesser height H' so as to form an upper end 16', which for ease of description will be included in the subsequent discussion of the upper end 16, unless specifically contrasted with a reduced upper end 16'. The upper end 16 may be reduced to upper end 16' before or after forming the floor 18, such as pouring a concrete floor 18. In some instances, a finished floor height or additional flooring or flooring material may be added to a concrete floor, such as tile, carpeting, or other flooring, for which additional height adjustment of a floor receptacle or wiring device 90 within a floor electrical outlet assembly 100 may be desirable. As such, the rough elevation adjustment of the floor receptacle 90 and fine adjustment of the floor receptacle 90 can be desirable, as provided for with the self-leveling floor mounted electrical outlet assembly 100. As used herein, the floor electrical receptacle or wiring device 90 comprises not only a high voltage electrical receptacle or socket, but in some instances may also comprise a wiring device, which includes low voltage applications, such as applications for cables, transmission lines, wiring, connecters, switches, for coaxial cables, phone lines, ethernet cables, and USB devices, as well as a receptacle or floor receptacle. For ease of description, the floor receptacle or wiring device 90 is hereinafter referred to in the description as a floor receptacle, but also includes a wiring device, such as for low voltage applications.

Figure 2:
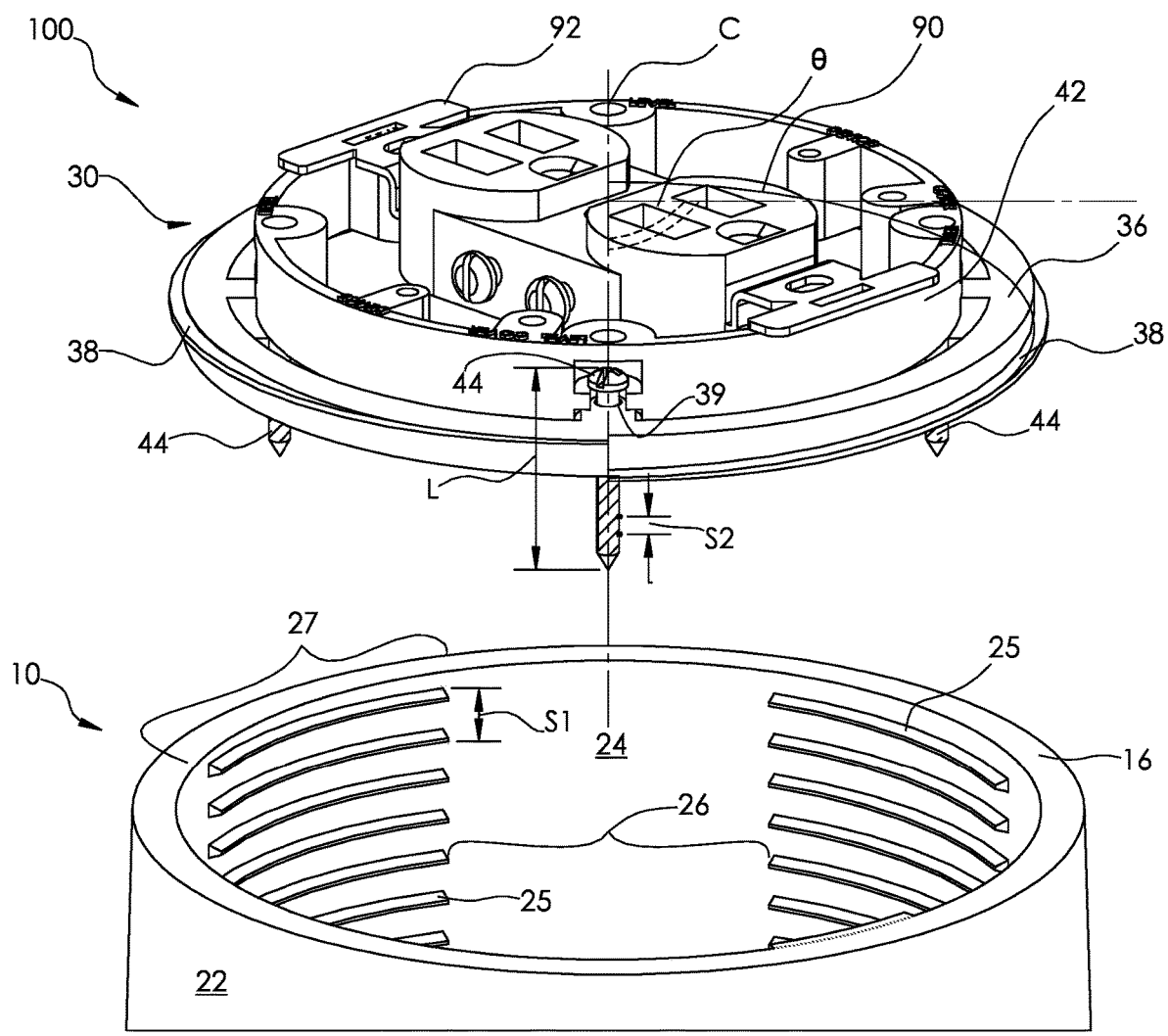
FIG. 2 depicts another exploded perspective view that provides a close-up view or additional detail from FIG. 1.

The housing 10 also comprises an outer surface 22 and a threaded inner surface or inner surface 24 opposite the outer surface 22. The inner surface 24 comprises threads 25 formed as inclined ridges, channels, or grooves that may be continuous or intermittent. When the threads 25 are formed intermittently, there may be spaces or gaps 26 formed horizontally between columns 27 of stacked threads 25, as shown in FIGS. 1 and 2. When the threads 25 are formed continuously, there may be no spaces or gaps 26, the threads continuing unbrokenly, such as in a continuous or unbroken spiral or helix, along the inner surface 24. In either case, the threads 25 may be angled or inclined along the threaded inner surface 24 of the housing 10. The threads 25 formed on the threaded inner surface 24 comprise a first threading spacing or first spacing S1. The first threading spacing S1 may be in a range of 2-20 millimeters, 3-10 mm, or thereabout or substantially so, wherein "about" or "substantially" means less than or equal to a percent difference of 50% or less, 40% or less, 30% or less, 20% or less, 10% or less, 5% or less, 3% or less, or 1% or less.

A mounting frame or leveling ring 30 may be formed of plastic, metal, or other suitable material that provides for rigid structural support for the coupling of the floor electrical receptacle 90 to the housing 10. The mounting frame 30 may be rotatably coupled to the threaded inner surface 24 of the cylindrical housing 10 and configured to adjustably position the mounting frame 30 within the cylindrical housing 10. The mounting frame 30 may comprise an outer disk or first portion 36 and a yoke support or second portion 42.

The outer disk 36 may comprise an outer edge 38 mateably coupled with the threaded inner surface 24. The outer disk 36 may also comprise at least one threaded opening 39 (such as at least three threaded openings 39). The threaded openings 39 extend vertically through the outer disk 36, and comprise a second threading spacing S2 less than the first threading spacing S1. The threaded openings 39 may be internally threaded.

A central axis C of the cylindrical housing 10 may also be axially aligned with a central axis, centroid, or center of the cylindrical housing 10, as well as aligned, coextensive, and axially aligned with a central axis, centroid, or center of the mounting frame 30 and aligned, coextensive, and axially aligned with a central axis, centroid, or center the floor electrical receptacle 90. The threaded openings 39 and threaded fasteners 44 disposed therein may form an angle Θ between each other as measured with respect to center C, as shown for example in FIG. 2. The threaded openings 39 and threaded fasteners 44 may be equidistantly spaced (or substantially so) with respect to each other, and as such, when three threaded openings 39 and three corresponding threaded fasteners 44 are present, each will have an included angle or angle Θ will be separated from each other by an angle of 100-140 degrees as measured with respect to a centerline C of the mounting frame 30.

The yoke support 42 comprises at least one threaded fastener 44 (such as at least three threaded fasteners 44), extending from the yoke support 42 to the threaded openings 39 in the outer disk 36. The floor electrical receptacle 90 may be coupled to a receptacle yoke 92 and may be further coupled to the yoke support or second portion of the mounting frame 42 of the mounting frame 30. The threaded fasteners 44 comprise the second threading spacing S2, and the threaded fasteners 44 are coupled to the threaded openings 39 to adjustably position the yoke support 42 with respect to the outer disk 36. For example, using one threaded fastener 44 through the yoke support 42 and coupled to the outer disk 36 an angle or slope of the floor electrical receptacle 90 can be adjusted, so as to have the floor electrical receptacle 90 disposed at an angle that matches, corresponds to, or goes along with, the finished floor 18. Similarly, in instances where additional flooring such as tile might be overlaid on a concrete finished floor 18, a height of the floor electrical receptacle 90 may be increased, or the position or elevation of the floor electrical receptacle 90 may be increased to have the floor electrical receptacle 90 and the outlet cover 50 at a height of the additional flooring. The height of the floor electrical receptacle 90 may be increased of adjusted, such as by using three or more threaded fasteners 44 through the yoke support 42 and coupled to the outer disk 36.

As such, the self-leveling floor mounted electrical outlet assembly 100 may be adjusted in two steps (or operations without regard for order) for positioning the floor electrical receptacle 90 and the outlet cover 50 at a desired position, level, and angle, with respect to a finished floor 18. First, the outer edge 38 of the outer disk 36 may be mateably coupled with the threaded inner surface 24 of the cylindrical housing 10 and be configured to provide for a rough elevation adjustment of the floor electrical receptacle 90 with respect to the housing 10 and the finished floor 18, such as by twisting, turning, or rotating the outer disk 36 of the mounting frame 30. Sloped sides or a varying cross-sectional areas of the cylindrical housing can be accounted for by a size of the threads 25. When twisting the outer disk 36 or the mounting frame 30 in a first direction the height H of the mounting frame 30 can increase, and when twisting the outer disk 36 or the mounting frame 30 in a second direction opposite the first direction the height H of the mounting frame 30 can decrease. In other words, an adjustable vertical offset between the outer disk 36 of the mounting frame 30 and the yoke support 42 of the mounting frame 30 is determined by a length L of the at least three threaded fasteners 44. Additionally, the adjustable vertical offset between the outer disk 36 of the mounting frame 30 and the yoke support 42, as controlled by the one or more threaded fasteners, need not occur equally. That is the adjustable space or vertical offset between outer disk 36 of the mounting frame 30 and the yoke support 42 of the mounting frame 30 may comprises a slope, pitch, or angle to match a slope, pitch, or angle of the finish floor 18 surrounding the electrical outlet assembly 100, with one of the at least one threaded fasteners 44 adjusted to a first distance and another of the at least one threaded fasteners 44 adjusted to a second distance different from the first distance.

Second, the threaded fasteners 44 extending from the yoke support 42 into the threaded openings 39 in the outer disk 36 are configured to provide for a fine elevation adjustment of the floor electrical receptacle 90 with respect to the housing 10 and the finished floor 18. When twisting the threaded fasteners 44 in a first direction the height H of the floor electrical receptacle 90 can increase (with respect to the housing 10 and the outer disk 36), and when twisting the threaded fasteners 44 in a second direction opposite the first direction the height H of the floor electrical receptacle 90 can decrease (with respect to the housing 10 and the outer disk 36).

The outlet cover or floor electrical receptacle cover or base 50 may be disposed over the floor electrical receptacle 90 and coupled to the mounting frame 30 with an opening 60 in the outlet cover with perimeter 62 of the opening 50 aligned with the electrical receptacle 90. The outlet cover 50 may be coupled with the floor electrical receptacle 90 or receptacle yoke 92 through mounting holes 54 and fasteners, such as screws, inserted at the mounting holes 54.

The opening 60 the floor electrical outlet cover 50 aligned with the floor electrical receptacle 90 allows the electrical receptacle 90 to be accessed and electrically coupled to power cords and various devices even when the electrical outlet cover 50 is coupled to the floor electrical receptacle 90. The floor electrical outlet cover 50 may also comprise at least one hinged flap, flap, or closure plug 70 hingedly coupled to the floor electrical outlet cover 50, the hinged flap 70 configured to move from a closed position that restricts access to the floor electrical outlet to an open position that provides access to the floor electrical receptacle 90.

A fastener 80 may be disposed adjacent the hinged flap 70, the fastener 80 configured to move from a closed position that restricts opening the hinged flap 70, to an open position that allows for unrestricted opening of the hinged flap 70. The fastener 80 may comprise a freely-rotating piece, a spring-loaded latch, a sliding button, or any other suitable or desirable structure for allowing for, or restricting, the opening of the hinged flap 70. The fastener 80 may comprise a rounded head and a straight edge along a portion of a perimeter of the rounded head. The flap 70, whether hinged or not, may comprise a perimeter 72 and a lip, ridge, flange, or protuberance 76 formed along, or adjacent, the perimeter 72.

The floor electrical outlet cover 50 may be coupled to the floor electrical receptacle 90 with a gasket 94 disposed between the floor electrical outlet cover 50 and the floor electrical receptacle 90 such that the floor electrical outlet cover 50 passes a water scrub test. In other words, the gasket may provide sufficient friction against the floor electrical outlet cover 50 or between the floor electrical outlet cover 50 and the floor electrical receptacle 90, so as to limit or reduce an amount of water that may pass from outside the floor electrical outlet cover 50 to the floor electrical receptacle 90. The gasket 94 may be formed of foam, rubber, polymer, or any other suitable material that is resilient, compliant, or elastically deformable. The gasket 94 may also comprise at least one opening 95 formed through the gasket 94 and aligned with the at least one opening 60, and the floor electrical receptacle 90.

Figure 3A:
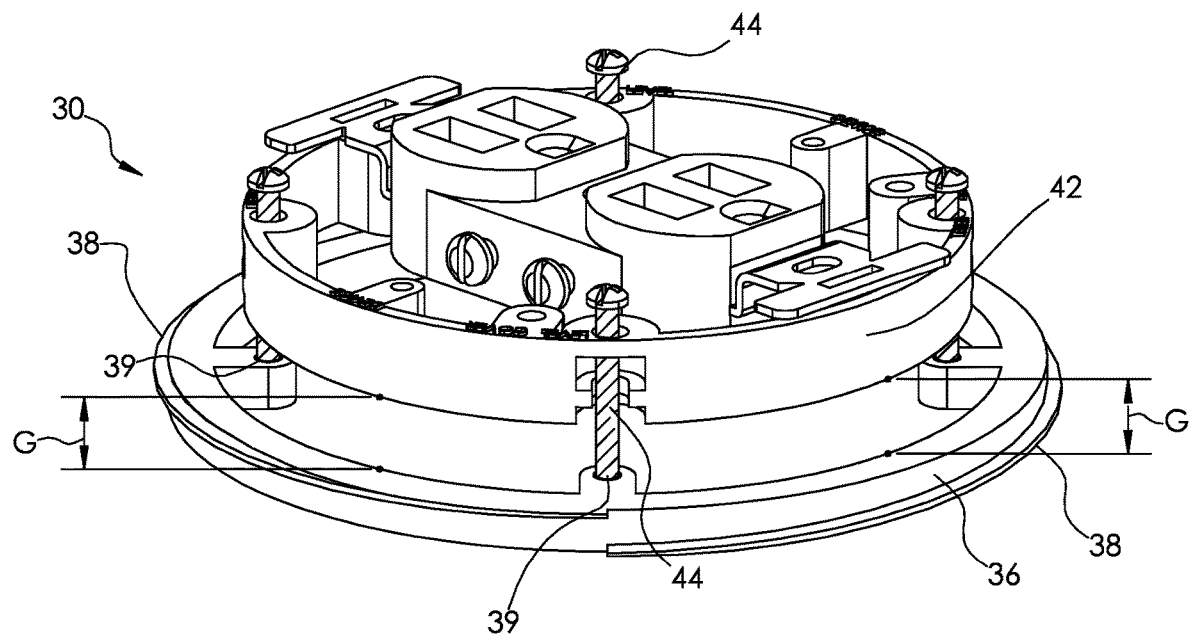
FIGS. 3A and 3B depict instances in which a mounting frame comprises an offset or gap.
Figure 3B:
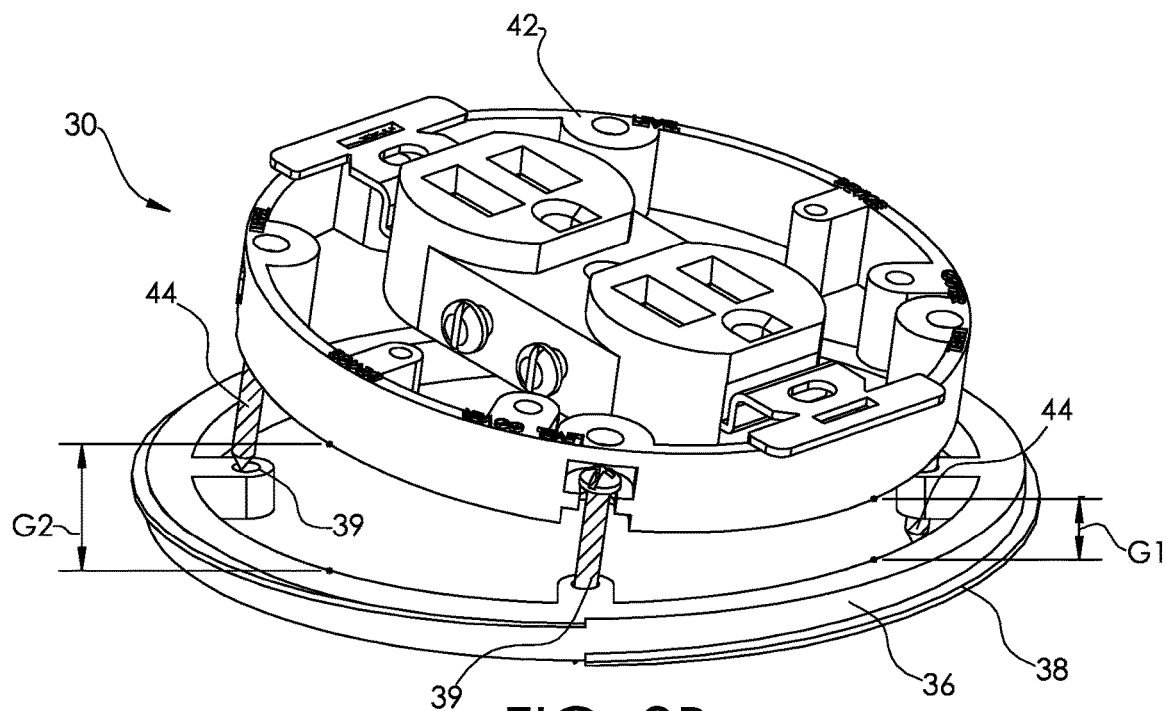

FIGS. 3A and 3B depict instances in which the yoke support 42 is offset from the outer disk 36 by a gap, offset, distance, or adjustable space G. As size of the gap G may vary based on the length L of the threaded fasteners 44, and a position of the threaded fasteners with respect to the yoke support 42 and the outer disk 36. FIG. 3A depicts an instance in which the gap G is equal or substantially equal for all sides or at all points along a perimeter of the mounting frame 30. FIG. 3B depicts an instance in which the gap G is not equal or substantially equal for all sides or at all points along a perimeter of the mounting frame 30. Instead, FIG. 3B shows the yoke support 42 may be angled or offset with respect to the outer disk 36, such that a gap G1 at a first side or portion of the mounting frame 30 is less than a gap G2 at a second side or portion of the mounting frame 30, opposite the first side or portion.

Figure 4A:
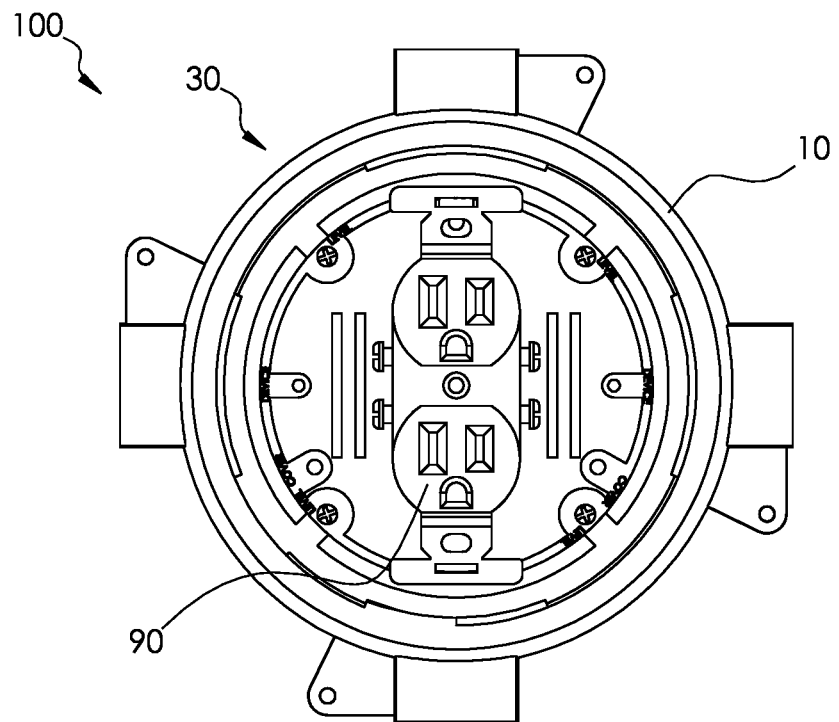
FIGS. 4 A and 4B depict various views of a mounting frame disposed within a housing.
Figure 4B:
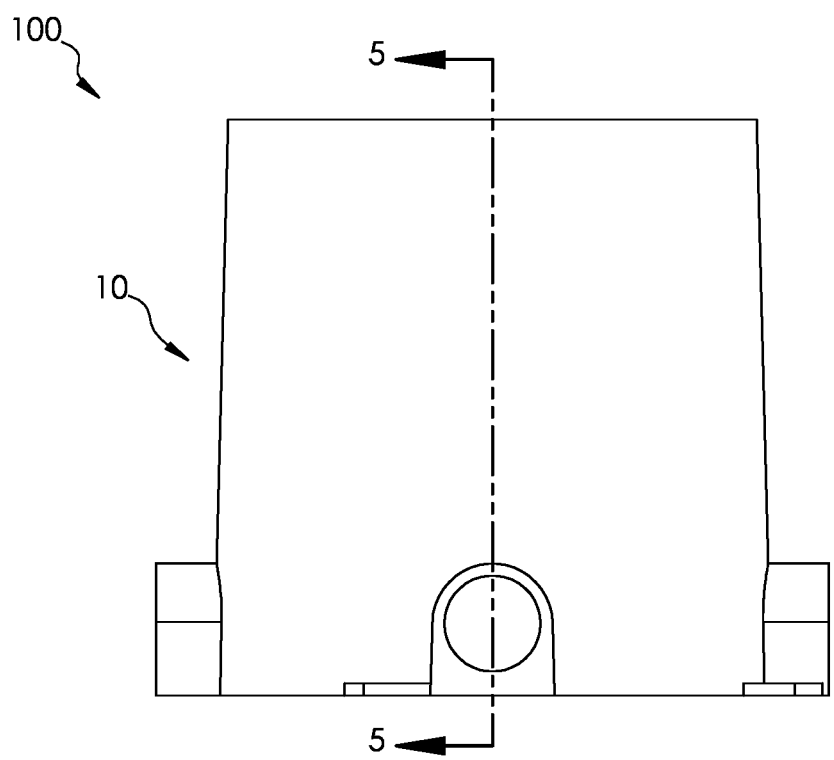

FIGS. 4A and 4B depict various views of an assembled assembly 100, with the mounting frame disposed therein, which may be considered as a continuation from FIG. 2. FIG. 4A shows a top or plan view of the assembly 100, while FIG. 4B shows a side or profile view that differs by 90 degrees from the view shown in FIG. 4A.

Figure 5:
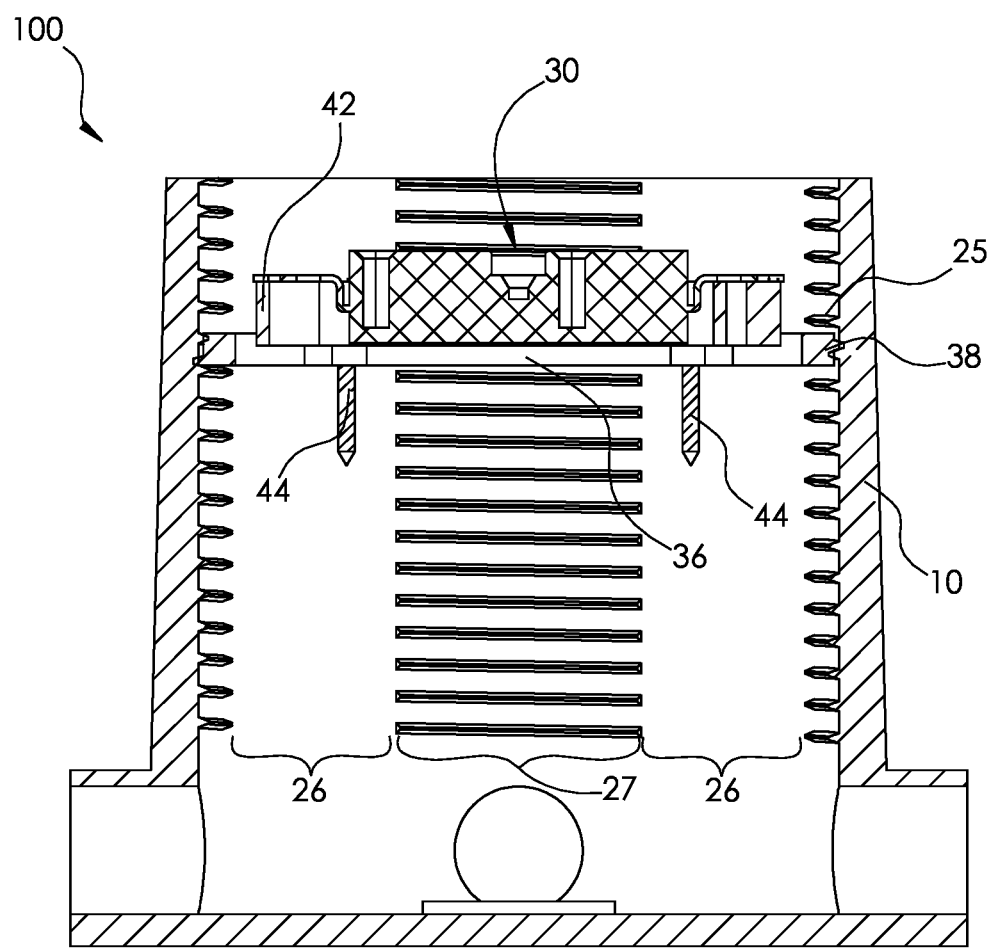
FIG. 5 depicts a cross sectional view of FIG. 4B depicting the mounting frame within the housing.

FIG. 5 depicts a cross-sectional view of the assembly 100 taken along the section line 5 shown in FIG. 4B, which reveals the mounting frame 30 disposed within the housing 10, and the yoke support 42 abutting or being snug against the outer disk 36, without the gap G disposed between the yoke support 42 and the outer disk 36.

Figure 6A:
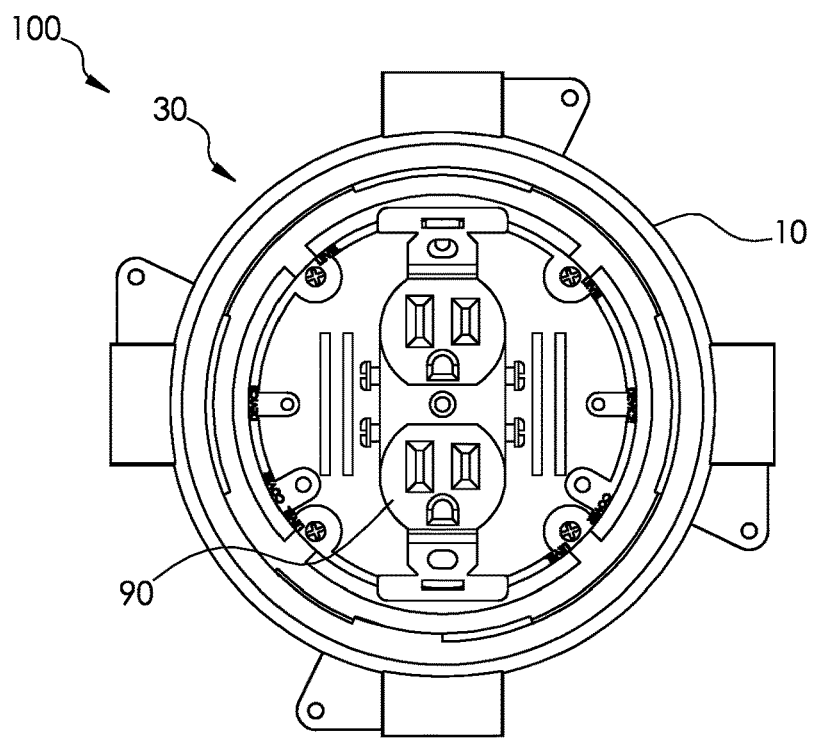
FIGS. 6 A and 6B depict various views of a mounting frame disposed within a housing.
Figure 6B:
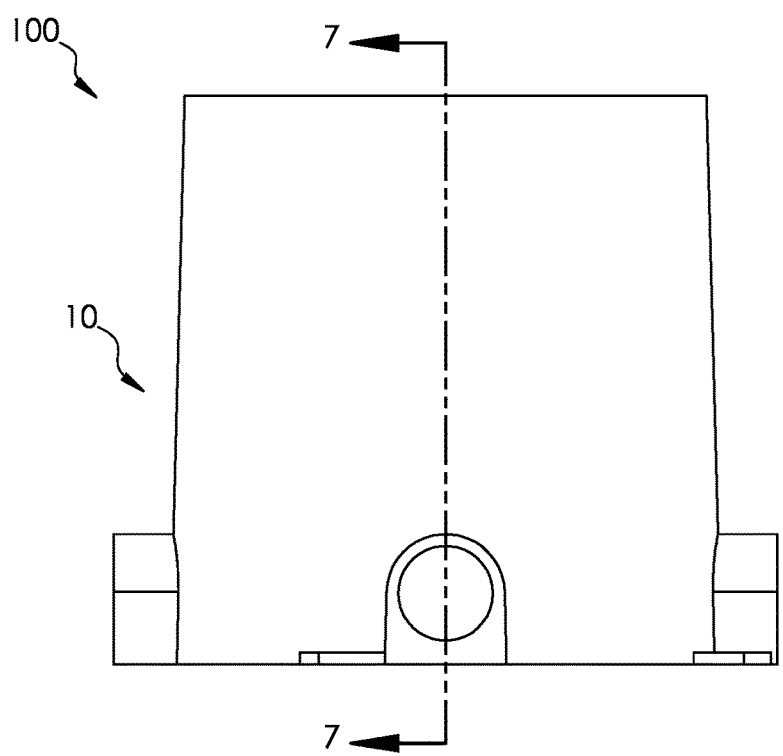

FIGS. 6A and 6B depict various views of an assembled assembly 100, with the mounting frame disposed therein, similar to FIGS. 4A and 4B. More specifically, FIG. 6A shows a top or plan view of the assembly 100, while FIG. 6B shows a side or profile view that differs by 90 degrees from the view shown in FIG. 6A.

Figure 7:
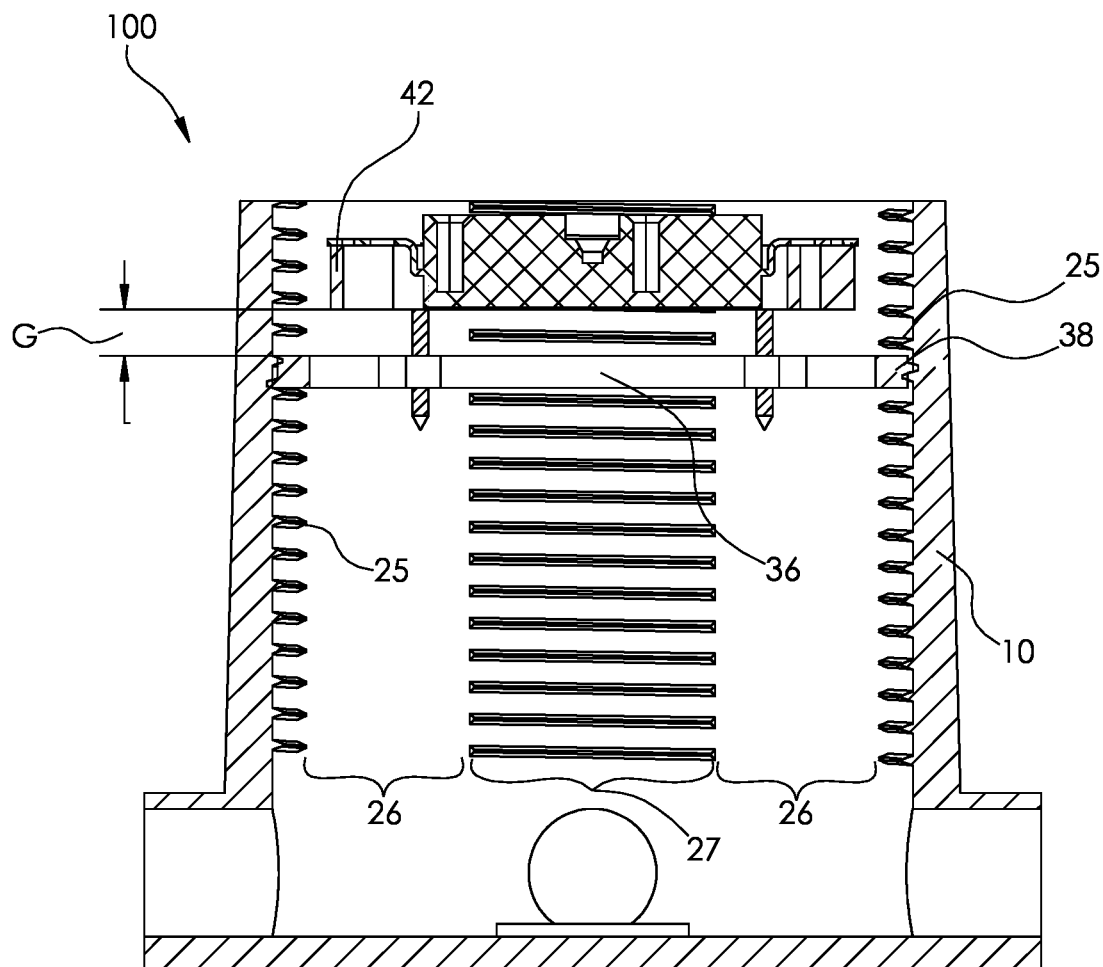
FIG. 7 depicts a cross sectional view of FIG. 6B depicting the mounting frame within the housing.

FIG. 7 depicts a cross-sectional view of the assembly 100 taken along the section line 7 shown in FIG. 6B, which reveals the mounting frame 30 disposed within the housing 10, and the yoke support 42 offset from the outer disk 36 with the gap G disposed between the yoke support 42 and the outer disk 36.

Figure 8A:
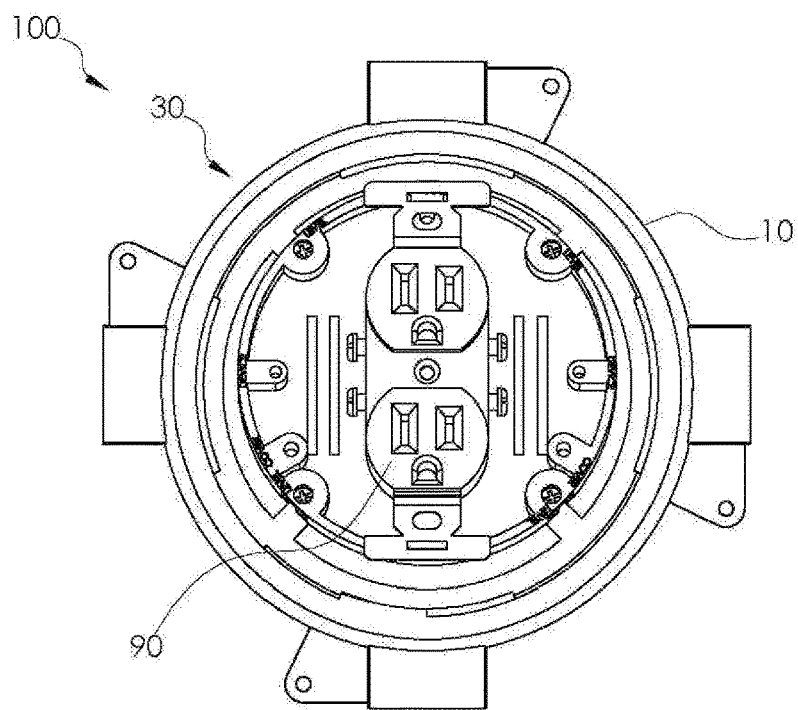
FIGS. 8 A and 8B depict various views of a mounting frame disposed within a housing.
Figure 8B:
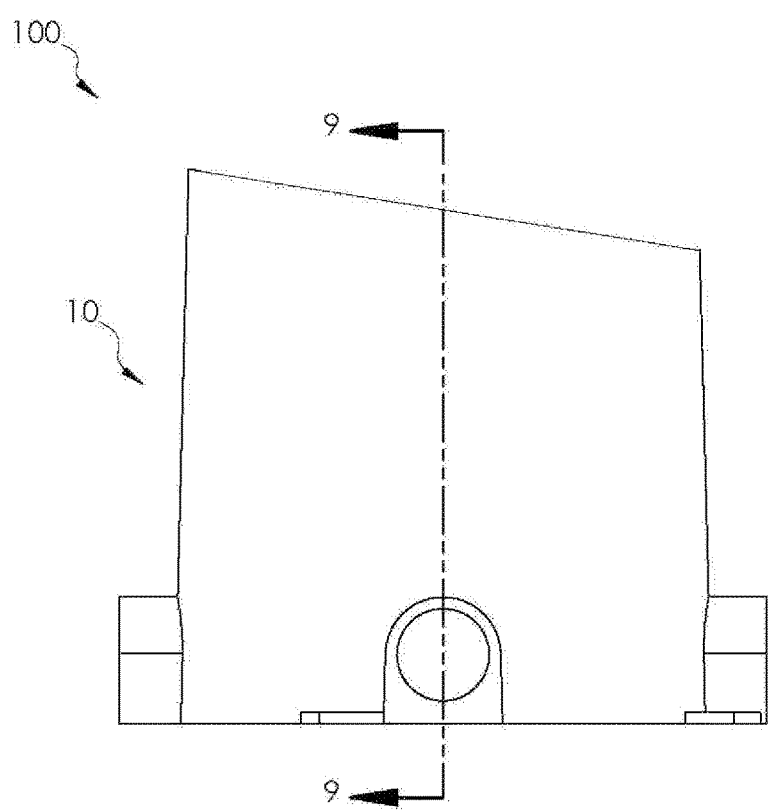

FIGS. 8A and 8B depict various views of an assembled assembly 100, with the mounting frame disposed therein, similar to FIGS. 4A and 4B as well as 6A and 6B. More specifically, FIG. 8A shows a top or plan view of the assembly 100, while FIG. 8B shows a side or profile view that differs by 90 degrees from the view shown in FIG. 6A. FIG. 8B also shows the upper edge 16 of the housing cut an angle, so as to match a slope or grade of a finished floor 18, as shown in FIG. 9.

Figure 9:
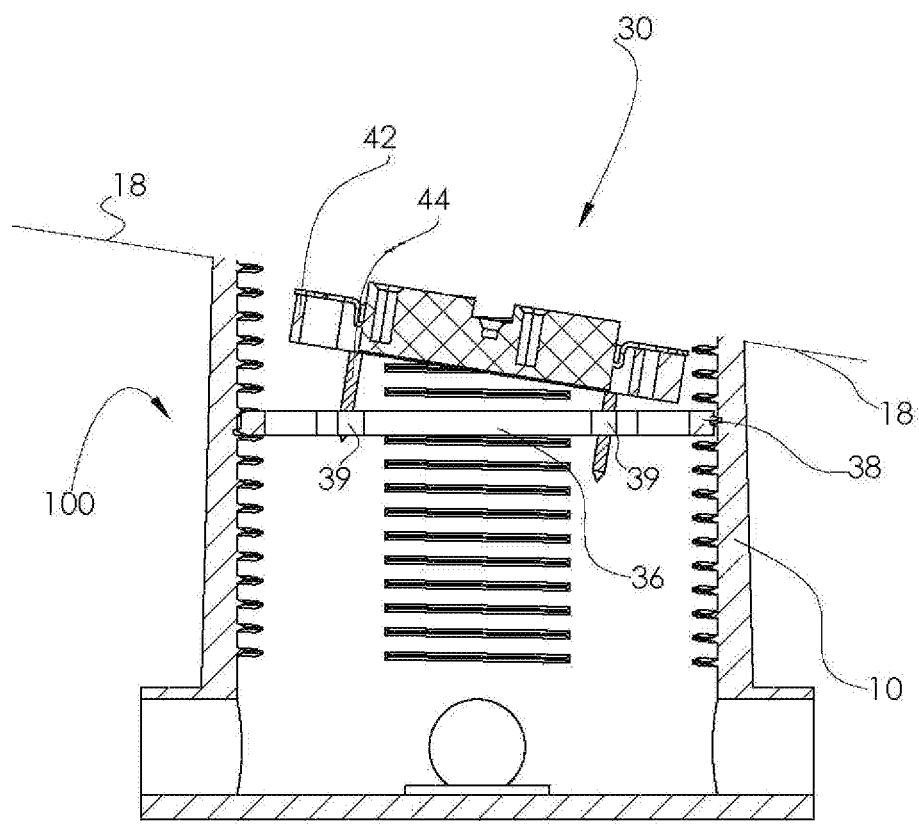
FIG. 9 depicts a cross sectional view of FIG. 8B depicting the mounting frame within the housing.

FIG. 9 depicts a cross-sectional view of the assembly 100 taken along the section line 9 shown in FIG. 8B, which reveals the mounting frame 30 disposed within the housing 10, and the yoke support 42 offset from, and at an angle with respect to, the outer disk 36. The adjustable space or gap G between the outer disk 36 of the mounting frame 30 and the yoke support 42 of the mounting frame 30 comprises a slope, pitch, or angle to match a slope, pitch, or angle of the floor 18 surrounding the electrical outlet assembly 100.

It will be understood that self-leveling electrical outlet assembly implementations are not limited to the specific assemblies, devices and components disclosed in this document, as virtually any assemblies, devices and components consistent with the intended operation of a self-leveling electrical outlet assembly may be utilized. Accordingly, for example, although particular electrical outlet assembly covers, lids, sleeves, latches, snap-fit couplers, hinges, frames, enclosures, bubble covers, housings, joints, protrusions, ledges, clamps, grooves, ridges, couplers, fasteners, power sockets, and other assemblies, devices and components are disclosed, such may include any shape, size, style, type, model, version, class, measurement, concentration, material, weight, quantity, and/or the like consistent with the intended operation of a self-leveling electrical outlet assembly implementation. Implementations are not limited to uses of any specific assemblies, devices and components; provided that the assemblies, devices and components selected are consistent with the intended operation of self-leveling electrical outlet assembly implementation.

Accordingly, the components defining any electrical outlet assembly implementations may be formed of any of many different types of materials or combinations thereof that can readily be formed into shaped objects provided that the components selected are consistent with the intended operation of a self-leveling electrical outlet assembly implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of implementations of self-leveling electrical outlet assemblies may vary according to different implementations.

Various self-leveling electrical outlet assemblies may be manufactured using conventional procedures as added to and improved upon through the procedures described here. Some components defining electrical outlet assembly implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the self-leveling electrical outlet assemblies are not limited to the specific order of steps as disclosed in this document. Any steps or sequence of steps of the assembly of outlet covers indicated herein are given as examples of possible steps or sequence of steps and not as limitations, since various assembly processes and sequences of steps may be used to assemble outlet covers.

The self-leveling electrical outlet assembly implementations described are by way of example or explanation and not by way of limitation. Rather, any description relating to the foregoing is for the exemplary purposes of this disclosure, and implementations may also be used with similar results for a variety of other applications requiring a configurable outlet cover.

What is claimed is:

1. A floor mounted electrical outlet assembly comprising:
a housing configured to be installed within a floor, the housing having an inner surface; and
a mounting frame configured to fit within the housing, couple with the inner surface of the housing, and support a wiring device within the housing, the mounting frame comprising:
a first portion threadedly coupled to the housing; and
a second portion mounted to the first portion through at least one fastener and configured to support the wiring device;
wherein the mounting frame is configured to allow adjustment of a height and an angle of the wiring device with respect to a plane of the floor and maintain the height and the angle of the wiring device with respect to the plane of the floor after adjustment has occurred.

2. The electrical outlet assembly of claim 1, wherein the first portion is configured to adjustably position the mounting frame within the housing and the second portion is configured to adjustably position the second portion with respect to the first portion.

3. The electrical outlet assembly of claim 1, wherein the at least one fastener is at least two fasteners and wherein an adjustable vertical offset between the first portion and the second portion at each fastener of the at least two fasteners is independent of the adjustable vertical offset at each other fastener of the at least two fasteners.

4. The electrical outlet assembly of claim 1, wherein the inner surface of the housing has a thread pitch that is different from a thread pitch of the at least one fastener.

5. The electrical outlet assembly of claim 1, wherein a tilt of the second portion with respect to the first portion is adjustable through adjustment of the at least one fastener.

6. The electrical outlet assembly of claim 1, wherein an orientation of the second portion with respect to the first portion is adjustable through adjustment of the at least one fastener.

7. A floor mounted electrical outlet assembly comprising:
a housing configured to be installed within a floor, the housing having an inner surface; and
a mounting frame configured to fit within the housing, couple with the inner surface of the housing, and support a wiring device within the housing;
wherein the mounting frame is configured to allow adjustment of a height and an angle of the wiring device with respect to a plane of the floor and maintain the height and the angle of the wiring device with respect to the plane of the floor;
wherein the mounting frame is threadedly coupled to the housing.

8. The electrical outlet assembly of claim 7, wherein the mounting frame comprises a first portion coupled to the housing and a second portion mounted to the first portion through at least one fastener, wherein the second portion is configured to support the wiring device.

9. The electrical outlet assembly of claim 8, wherein the at least one fastener is at least two fasteners and wherein an adjustable vertical offset between the first portion and the second portion at each fastener of the at least two fasteners is independent of the adjustable vertical offset at each other fastener of the at least two fasteners.

10. The electrical outlet assembly of claim 8, wherein the inner surface of the housing has a thread pitch that is different from a thread pitch of the at least one fastener.

11. The electrical outlet assembly of claim 7, wherein the angle of the wiring device with respect to the plane of the floor is adjustable through adjustment of at least one fastener extending between the wiring device and the mounting frame.

12. A floor mounted electrical outlet assembly comprising:
a housing configured to be installed within a floor; and
a mounting frame configured to fit within the housing and support a wiring device within the housing;
wherein the mounting frame is configured to allow adjustment of an angle of the wiring device with respect to a plane of the floor and maintain the angle of the wiring device with respect to the plane of the floor;
wherein the mounting frame is threadedly coupled to the housing.

13. The electrical outlet assembly of claim 12, wherein the housing comprises an inner surface and the mounting frame is configured to couple with the inner surface.

14. The electrical outlet assembly of claim 12, wherein the mounting frame is configured to allow adjustment of a height of the wiring device with respect to the plane of the floor and maintain the height of the wiring device with respect to the plane of the floor after adjustment has occurred.

15. The electrical outlet assembly of claim 12, wherein the mounting frame comprises a first portion coupled to the housing and a second portion mounted to the first portion through at least one fastener, wherein the second portion is configured to support the wiring device.

16. The electrical outlet assembly of claim 15, wherein the at least one fastener is at least two fasteners and wherein an adjustable vertical offset between the first portion and the second portion at each fastener of the at least two fasteners is independent of the adjustable vertical offset at each other fastener of the at least two fasteners.

17. The electrical outlet assembly of claim 15, wherein an inner surface of the housing has a thread pitch that is different from a thread pitch of the at least one fastener.

18. The electrical outlet assembly of claim 12, wherein the angle of the wiring device with respect to the plane of the floor is adjustable through adjustment of at least one fastener extending between the wiring device and the mounting frame.

* * * * *